Feb. 8, 1938. R. E. BECHTOLD 2,108,028
INTERLOCKING MECHANISM FOR GASOLINE DISPENSERS
Filed July 13, 1936 4 Sheets-Sheet 1
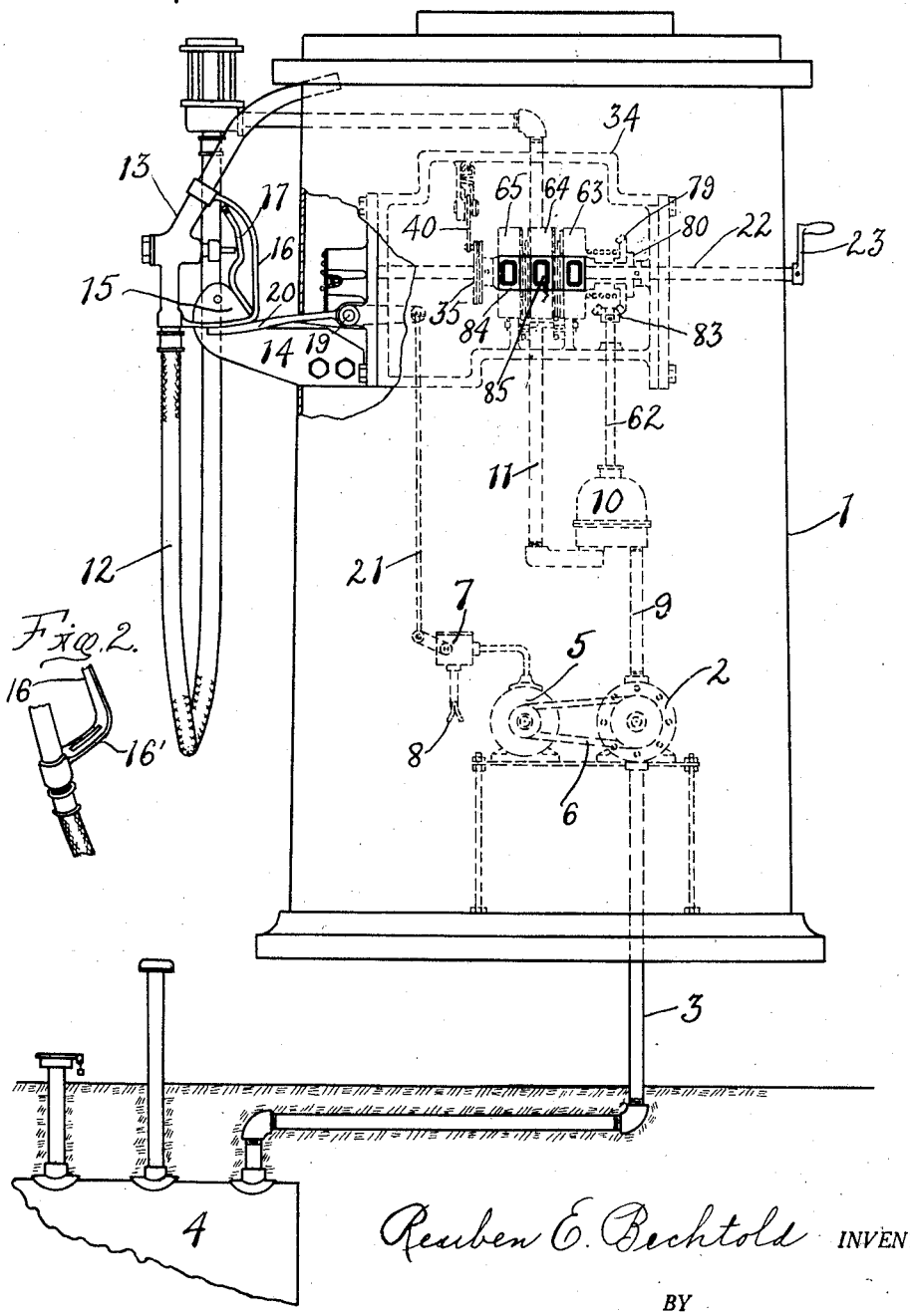
Reuben E. Bechtold INVENTOR.
BY
ATTORNEY.

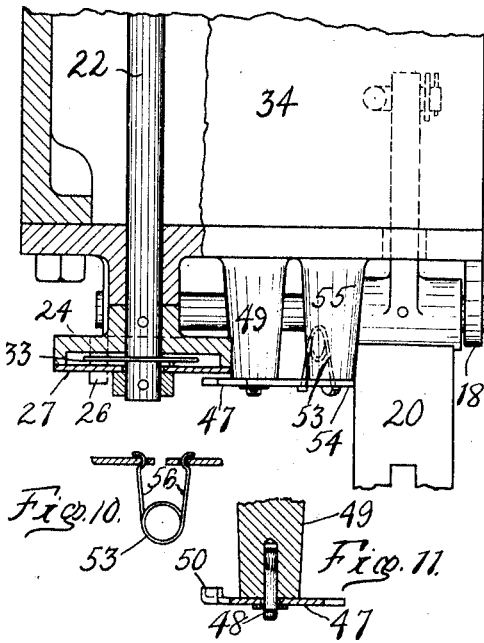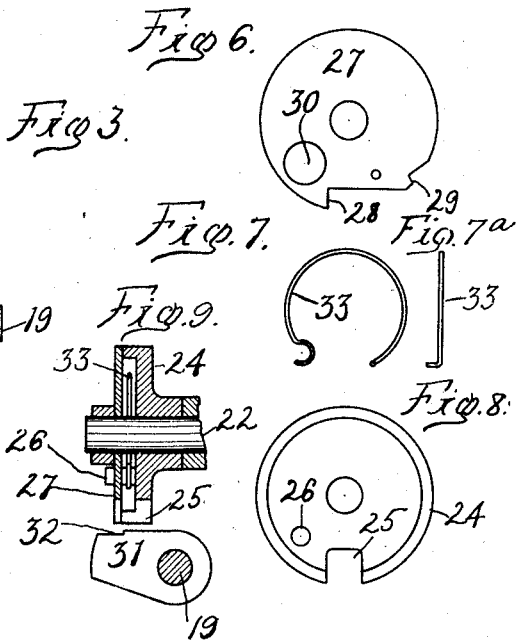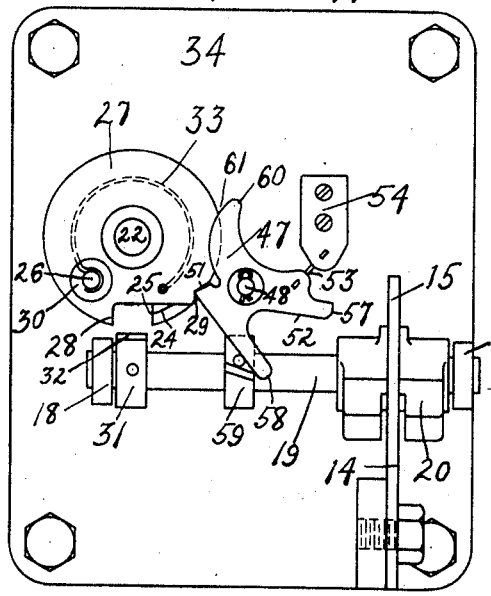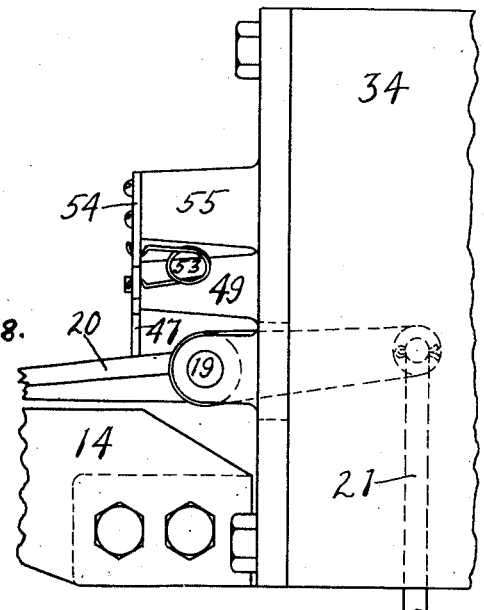

Feb. 8, 1938. R. E. BECHTOLD 2,108,028
INTERLOCKING MECHANISM FOR GASOLINE DISPENSERS
Filed July 13, 1936 4 Sheets-Sheet 3
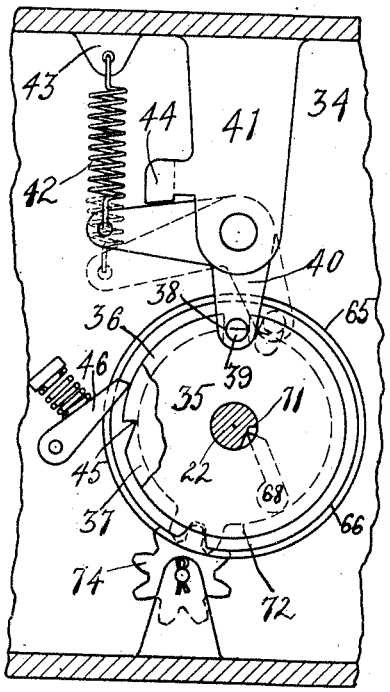
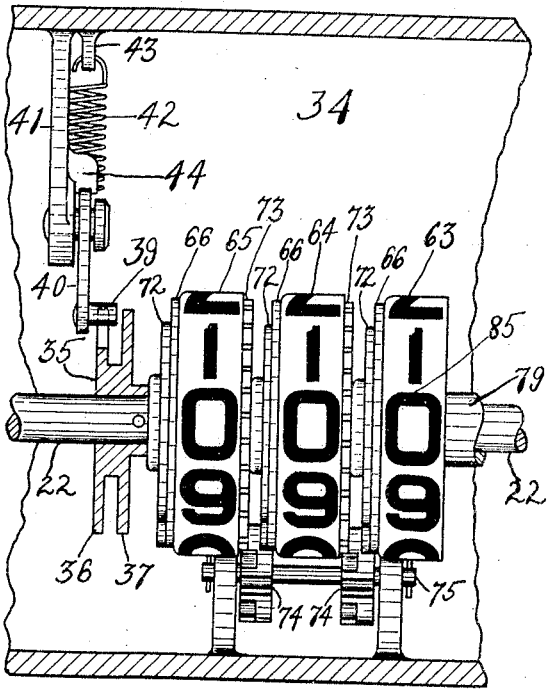
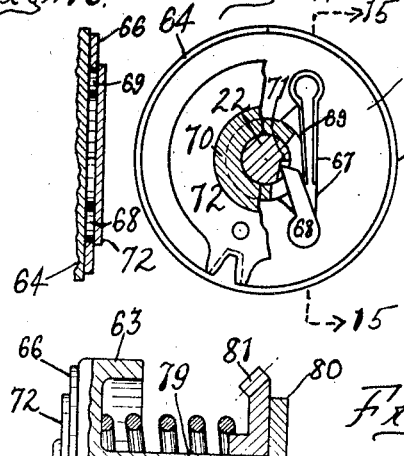
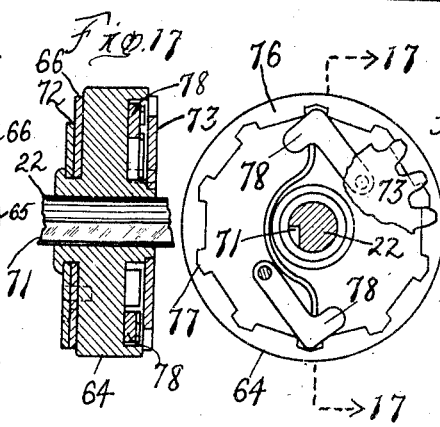
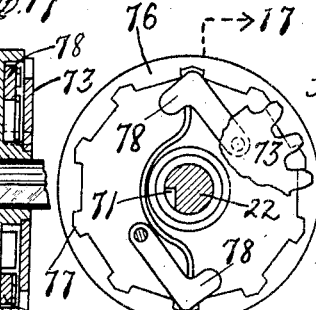
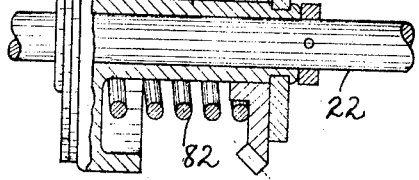
INVENTOR.
Reuben E. Bechtold
BY
A. G. Burns
ATTORNEY.

Feb. 8, 1938.  R. E. BECHTOLD  2,108,028
INTERLOCKING MECHANISM FOR GASOLINE DISPENSERS
Filed July 13, 1936  4 Sheets-Sheet 4
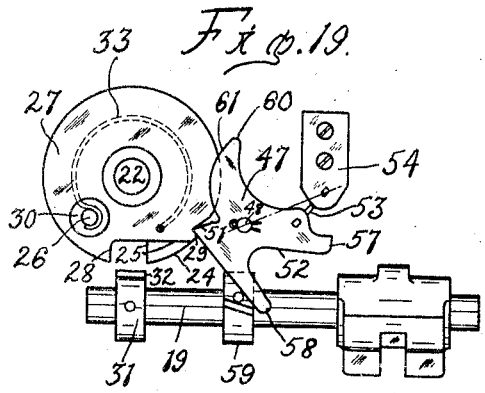
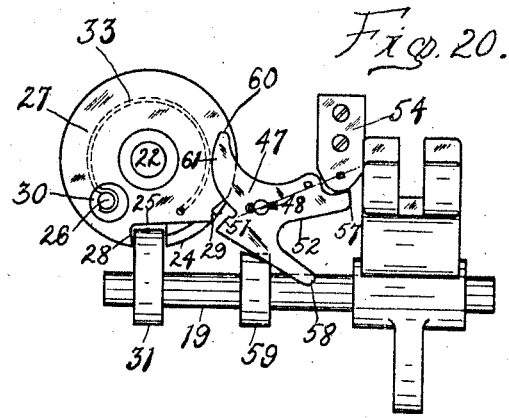
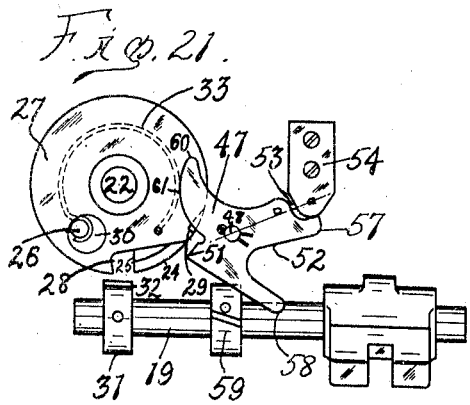
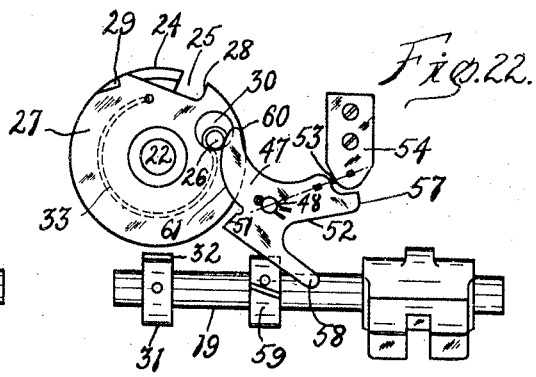
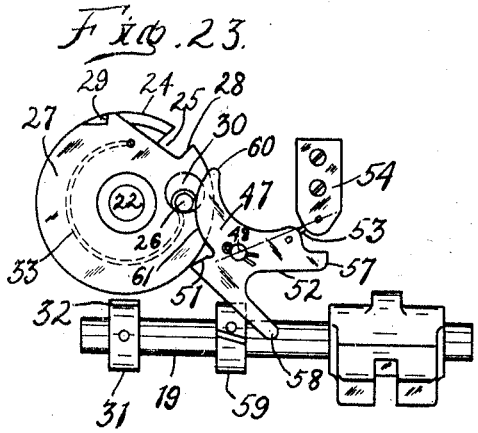
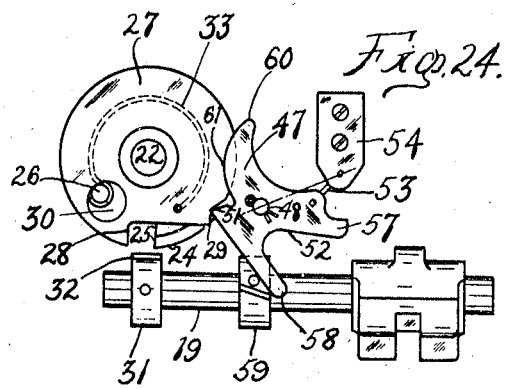
Reuben E. Bechtold INVENTOR.
BY
H. G. Burns ATTORNEY.

Patented Feb. 8, 1938

2,108,028

UNITED STATES PATENT OFFICE 2,108,028

INTERLOCKING MECHANISM FOR GASOLINE DISPENSERS

Reuben E. Bechtold, Fort Wayne, Ind., assignor to Tokheim Oil Tank and Pump Company, Fort Wayne, Ind., a corporation of Indiana Application July 13, 1936, Serial No. 90,373

6 Claims. (Cl. 221—95)

This invention relates to improvements in interlocking mechanism for gasoline dispensers of that type in which is incorporated a switch-controlled electric motor that operates a pump by which gasoline is withdrawn from a reservoir and forced through a delivery flow line in which is connected a metering appliance including a counter or register having a reset mechanism, and a dispensing hose terminating with a manually operated valve-controlled nozzle that is lodged when not in use upon a support connected with the dispenser.

An object of the invention is to provide an interlocking mechanism associated with the support for the dispensing nozzle, the reset mechanism and the motor switch by which the reset mechanism can only be operated while the motor switch is open.

Another object is to provide means to circumvent operation of the reset mechanism during delivery of gasoline from the dispenser, and also to prevent delivery of gasoline from the dispenser during operation of the reset mechanism.

It is also an object to provide a locking means in connection with the nozzle and its support to prevent unauthorized operation of the dispenser.

Other objects and advantages of the invention will appear in the following description.

An illustrative embodiment of the invention is shown in the accompanying drawings, in which:—

Fig. 1 is a front elevation of a dispenser in which the invention is embodied;

Fig. 2 is a fragmentary perspective view of a dispensing nozzle;

Fig. 3 is a fragmentary plan view of the interlocking mechanism, a portion being in section;

Fig. 4 is a front elevation showing part of the interlocking mechanism and nozzle support;

Fig. 5 is a side elevation projected from Fig. 4;

Figs. 6, 7, 7—A, 8, 9, 10, and 11 are detail views of parts of the interlocking mechanism that appear more or less obscurely in Figs. 3, 4 and 5.

Fig. 12 is an end elevation of the registering mechanism, parts being in section;

Fig. 13 is a side elevation projected from Fig. 12;

Fig. 14 is an end view of one of the registering wheels and reset mechanism in connection therewith, the actuating shaft being in section, and a part cut away;

Fig. 15 is a fragmentary cross-section of Fig. 14 approximately on the line 15—15 thereof;

Fig. 16 is an end elevation of the registering apparatus, parts being cut away and the actuating shaft in section;

Fig. 17 is a vertical section projected from Fig. 16 on the lines 17—17 thereof;

Fig. 18 is a side view of a friction clutch for actuating the register mechanism, parts being broken away and other parts shown in section;

Figs. 19, 20, 21, 22, 23, and 24 are end elevations of the interlocking mechanism showing respectively the positions of the parts thereof in corresponding stages in the cycle of its operation.

The dispenser

The illustrative embodiment of the invention consists of a gasoline dispenser having a housing 1 in which is located a pump 2, the suction pipe 3 of which is connected with an underground tank 4 to receive liquid therefrom upon operation of the pump.

An electric motor 5 is operatively connected with the pump by any suitable motion-transmitting means such as a belt or chain 6, said motor being provided with a controlling switch 7 having circuit conductors 8 connected therewith by which energy is supplied to the motor in the usual manner. The discharge pipe 9 of the pump is connected with the intake of a meter 10 of any suitable type that is operated by the flow of liquid therethrough under pressure, and the outlet of said meter is connected with a dispensing line pipe 11 that terminates with a dispensing hose 12 provided at its free end with a manually-operated valve-controlled nozzle 13.

A supporting bracket is provided for lodgment of said nozzle when not in use, said bracket consisting of a plate 14 rigidly secured in the housing, its outer end projecting exteriorly thereof and having an upturned perforated extension 15 that projects through the lower end of the guard 16 on the nozzle which has a slot 16' to receive said extension. Also, when the nozzle is positioned on the bracket, the trigger 17 for the nozzle has contact with the extension 15 so that operation of the trigger to open the nozzle valve is thereby circumvented.

Preferably, the extension 15 on the bracket is perforated for the reception of a padlock (not shown) by which when applied in the usual manner removal of the nozzle from its support by unauthorized persons is obviated.

The interlocking mechanism

In suitable bearings 18 located in the housing is mounted a horizontal rock-shaft 19 upon which is rigidly secured a switch-control lever 20, the rear end of which is operatively associated with the motor switch by means of a connecting rod 21. The front end of the lever 20 is bifurcated and extends astride of the extension 15 on the supporting bracket so that when the nozzle is deposited upon the bracket, the lever 20 is tilted whereupon the switch 7 is moved to open position and consequently operation of the motor and pump is stopped. Closing of the switch 7 and renewed action of the motor and pump is dependent upon removal of the nozzle from the supporting bracket and the subsequent raising of the bifurcated outer end of the lever 20.

In the housing is suitably mounted a rotatable register-actuating shaft 22 one end of which extends through the back wall of the housing and is provided with an operating crank 23. The opposite end of the actuating shaft has secured thereon a flanged wheel 24 that has a peripheral notch 25 made therein, and also a stud 26 that extends parallel with and eccentric to the axis of the wheel. Also, on said actuating shaft is loosely mounted a tumbler plate 27 having two peripheral shoulders 28 and 29, and also an eccentrically located aperture 30 through which the stud 26 on the wheel 24 projects and has therein limited angular play with respect to the axis of the actuating shaft.

Upon the rock-shaft 19 is secured a lock-finger 31 having in its upper outer end an offset 32, which lock-finger is adapted to be received in the notch 25 in the wheel 24 when said notch is moved to a position immediately over said finger and the rock-shaft 19 is turned by upward movement of the outer end of the lever 20 thus permitting the motor switch 7 to be closed.

An expansion spring 33 is disposed in the wheel 24 the ends of which are connected respectively with the tumbler-plate 27 and the stud 26 on the flanged wheel. The tendency of the spring is to rotatively move said tumbler-plate relative to the wheel so that the shoulder 28 at certain periods is moved to a position where it partially overlaps the notch 25 in the wheel 24 and overhangs the offset 32 in the lock-finger 31.

At such times when the notch 25 in the wheel 24 is disposed over the lock-finger 31, and the shoulder 28 on the tumbler-plate 27 overhangs the offset 32 on the lock-finger, upon raising of the outer end of the switch-closing lever 20 movement thereof and the rock-shaft 19 is permitted to an extent that the lock-finger is moved partially into the notch 25 in the wheel which prevents turning movement thereof, while the movement of said lock-finger is limited by contact of its offset outer end with the perimeter of the tumbler-plate 27, thus preventing the rock-shaft from being revolved farther to switch closing position. (See Fig. 21.) When the wheel is turned to such positions that its notch 25 is disalined with the lock-finger, the rock-shaft is estopped from movement to switch opening position by contact of the lock-finger with the perimeter of the wheel and during such periods, because of the offset 32, interference of the lock-finger with movement of the tumbler-plate is thus avoided.

In the upper part of the housing 1 is positioned a stationary case 34 through which the actuating shaft extends and is journaled therein for rotary movement. Secured upon the shaft 22 is a trip-wheel 35 having two radial flanges 36 and 37 spaced apart. The flange 36 has made in its perimeter a radial recess 38 for the reception of a stud 39 that projects from one arm of a bell-crank 40 that is pivotally supported on a bracket 41. The other arm of the bell-crank is connected by means of a retracting spring 42 with a stationary lug 43, and the bracket has thereon a projecting stop 44 by which the spring actuated movement of the bell-crank is limited. The flange 37 has made in its perimeter a notch 45 for the reception of a spring-pressed pawl 46 whereby continuous backturning movement of the trip-wheel is prevented. The trip-wheel 35 and the previously referred to flanged wheel 24 are immovable on the actuating shaft 22 and are relatively positioned thereon so when the trip-wheel is held in stop position by the stud on the bell-crank 40 and backturning movement of the trip-wheel thereby prevented, the notch 25 in the flanged wheel 24 is then held in lock-finger receiving position. (Fig. 19.) When the trip-wheel is turned forwardly away from stop position by manipulating the actuating shaft 22, the bell-crank is tilted in opposition to the restraint of the spring 42 and forward turning movement of the trip-wheel is resisted until the lug on the bell-crank is raised entirely out of the recess 38 and bears upon the perimeter of the flange 36. By this construction the trip-wheel is yieldingly held by the bell-crank normally in stop or zero position at one definite point in its cycle of movement. When the trip-wheel is manipulated forwardly an insufficient distance for complete disengagement of the stud on the bell-crank from the recess 38, the bell-crank during such period yieldingly opposes such limited forward movement and upon release of the actuating shaft by the operator the trip-wheel automatically is turned back to stop position by the reactionary movement of the bell-crank. The notch 45 in the flange 37 and its engaging pawl 46 are so located relatively with respect to the recess 38 and the bell-crank 40 that said pawl enters the notch 45 and thereby prevents backturning movement of the trip-wheel at a time immediately following disengagement of the stud on the bell-crank from the recess 38.

A latch 47 is arranged to have engaging relation with the tumbler-plate 27 and is formed of a plate mounted upon a pivot 48 that projects from a boss 49 which extends from one end of the case 34 at a point adjacent to and spaced from the flanged wheel 24. The latch has an inturned lip 50 (Fig. 11) located at the part indicated by 51 by which the shoulder 29 is engaged and the tumbler-plate thereby held in lock-finger receiving position. The latch has a branch 52 that is connected by means of a toggle spring 53 with an anchor plate 54 that is secured upon another boss 55 that projects from the case 34. The arms 56 of the spring 53 tend to spread apart so that the latch is yieldingly sustained in one of its extreme positions or the other accordingly to which position it is moved. The branch 52 has an extension 57 adapted to have contact with the anchor-plate 54 and thereby limit oscillating movement of the latch in one direction at a point after the lip 50 is disengaged from the shoulder 29. The latch has a pendent portion constituting a trigger 58 that is engaged by a trip-finger 59 secured on the rock-shaft 19 so that when the outer end of the switch control lever 20 is raised the latch is turned out of engagement with the shoulder 29 on the tumbler-plate. Thus, the tumbler-plate is released from engagement with the latch, whereupon the tumbler-plate by the action of its spring 33 is moved to a position with its shoulder 28 pressed against the adjacent side of the lock-finger 31. The latch also has another branch 60 providing a convex cam face 61 that during the revolution of the flanged wheel 24, is engaged by the stud 26 and thereby the latch is tilted into its engaging position.

The counter

A counter or register is arranged in operative relation with the actuating shaft 22 and the coupling shaft 62 of the meter 10, for indicating the quantity of liquid that flows through the meter. Preferably, the counter consists of a series of integrating wheels 63, 64 and 65 respectively that are concentrically mounted loosely upon the actuating shaft 22 arranged in successive order. The wheel 63 has upon the end thereof adjacent the next succeeding wheel 64 a chambered plate 66, the chamber 67 therein being shaped so as to contain a pawl 68 and a spring 69 for holding the pawl operatively in position. The free end of the pawl 68 projects loosely through the hub 70 and by pressure of the spring 69 bears against the actuating shaft 22 so as to have engagement with a groove 71 that extends longitudinally in the side of the actuating shaft whereby upon turning of said shaft in one direction the integrating wheel 63 is rotated with said shaft.

A plate having two peripheral teeth constituting a segmental gear plate 72 is secured upon the hub of the wheel 63 concentric therewith and is held against the outer face of the chambered plate 66 so as to confine the spring and pawl within the chamber 67. Upon the end of the integrating wheel 64, adjacent the former integrating wheel 63 is secured concentric therewith a gear 73 having peripheral teeth that mesh with a transfer gear 74, of the ordinary type, which is mounted for free rotary movement on a stationary shaft 75 and is intermittently actuated by the segmental gear. The gear tooth ratio between the segmental gear plate 72 and the gear 73, in the present instance, is ten to one. Thus, upon one cycle of the integrating wheel 63, the adjacent wheel 64 will be revolved through the medium of the transfer gear one-tenth of one revolution.

The end of the integrating wheel 64 adjacent the former wheel 63 has an axial annular flange 76 provided with an internal series of equally spaced notches 77 that are engaged by a pair of spring-pressed pawls 78 which are pivotally supported in connection with the gear 73. The arrangement of said pawls and the notched flange is such as to cause relative rotation of the integrating wheel 64 on said shaft in one direction and to permit concurrent rotation of said integrating wheel upon engagement of the pawl 68 in the groove 71 when said actuating shaft is turned in like direction.

The integrating wheel 64 also has upon its end opposite the integrating wheel 65 a chambered plate 66 containing a spring-pressed pawl 68 that has engagement with the groove 71 in the actuating shaft as in the former instance with respect to the integrating wheel 63, and the integrating wheel 65 has on its end opposite said wheel 64 a gear 73, which together with the segmental gear plate 72 on the adjacent integrating wheel 64 are operatively associated with another transfer wheel 74. Thus, upon each revolution of the wheel 64, the wheel 65 is progressed one-tenth of one revolution. The wheel 65 like the wheel 64 has an internally notched flange 76 and spring-pressed pawls 78 that function in the same manner as the corresponding parts respecting the integrating wheel 64. The integrating wheel 65 also is provided on its opposite end with a chambered plate 66 and plate 72 containing a spring-pressed pawl 68 that has engagement with the groove 71 in the same manner as the corresponding parts respecting the other integrating wheels.

One end of the hub 79 of the integrating wheel 63 is elongated and has secured at its outer end a friction plate 80, and adjacent thereto on said hub is loosely mounted concentric therewith a bevel gear 81 that is held in frictional contact with said plate 80 by a compression spring 82 which is interposed between the bevel gear 81 and the adjacent wall of the wheel 63. The gear 81 meshes with a driving pinion 83 on the coupling shaft 62 of the meter 10, so that as the meter is actuated the integrating wheel 63 will be rotated and the integrating wheels 64 and 65 progressed through the medium of their geared connections therefor provided.

A sight opening 84 made in the wall of the housing 1 adjacent to and extending along the sides of the integrating wheels exposes to view the cardinals 85 as in the usual manner, and thus is indicated the quantity of liquid dispensed through the meter.

The location of the pawls 68 on their respective wheels is such that when said pawls have engagement in the groove 71 in the actuating shaft at the same time, the cardinals of like denomination of the several wheels are then disposed in alinement, and the trip-wheel 35 is so located angularly on the actuating shaft with respect to the groove 71 therein that when said trip-wheel is turned to position for reception in the recess 38 of the stud 39 on the bell-crank, the cardinal ciphers on the integrating wheels then are alined and sustained at the sight opening 84.

As the stud 39 enters the recess 38, upon release of the handle 23 by the operator, the trip-wheel and the actuating shaft is turned backwardly to the zero point of said trip-wheel by the spring-actuated bell-crank. Thus, the groove 71 in the actuating shaft is moved back from the engaging ends of the pawls 68 and clearance thereby is provided to insure subsequent entrance of said pawls into the groove upon completion of each cycle of the respective integrating wheels. In this manner resetting of the integrating wheels is accomplished by rotation of the actuating shaft one complete revolution plus a small fractional portion of an additional revolution sufficient to compensate for the backlash action of the bell-crank upon the trip-wheel that follows entrance of its stud into the recess 38.

Operation

When the dispenser is idle the hose nozzle is positioned on its supporting bracket and while thus disposed prevents operation of the switch control lever 20 thereby forestalling operation of the motor and pump connected therewith.

To operate the dispenser, the hand crank 23 is turned, in the present instance, counterclockwise until all of the pawls 68 engage in the groove 71 and the integrating wheels thereby entrained with the rotating actuating shaft, and the trip-wheel 35 reaches beyond its zero position sufficiently to permit entrance of the lug on the bell-crank 40 into the recess 38, after which, upon release of the crank by the operator, the trip-wheel is automatically moved back by the action of the bell-crank to its zero position, while the integrating wheels are held in their respective indicating positions by the mechanism therefor provided. At this stage in the operation the cardinal ciphers are disposed at the sight opening and the flange-wheel 24 and the tumbler-plate 27 are disposed in lockfinger receiving position, the tumbler-plate being held in receiving position by the latch 47 (Fig. 19) thereby permitting (upon removal of the hose nozzle from its supporting bracket) manual operation of the switch control lever 20 and consequent turning of the rock-shaft 19. When the switch control lever is raised to switch closing position (Fig. 20), the rock-shaft is turned accordingly, the lock-finger enters the recess 25 and the trip finger 59 engages and turns the latch 47 out of locking position whereupon the tumbler-plate through action of its spring 33 is turned to an extent limited by contact of its shoulder 28 with the adjacent side of the lock-finger. While the parts are thus positioned the actuating shaft is locked against turning movement, the switch is closed, the pump is actuated by the motor, and upon opening of the nozzle, liquid is delivered from the underground tank 4 through the meter 10 and dispensing line 11. The passage of the liquid through the meter causes operation thereof and consequent progression of the integrating wheels by which is indicated the amount of liquid dispensed. The dispensing operation is terminated by closing the nozzle and replacing the nozzle upon its supporting bracket, whereupon the switch control lever is automatically moved to switch opening position causing operation of the pump to cease, and concurrent turning of the rock-shaft and withdrawal of the lock-finger from engagement with the flange-wheel 24 and tumbler-plate 27. (Fig. 21.) Then, the tumbler-plate, by action of its spring 33, is automatically moved so that the shoulder 28 thereof overhangs the lock-finger and thereby prevents reclosing of the switch and consequent operation of the pump. Thus, the apparatus is locked against renewal of the dispensing operation without first resetting of the integrating wheels and trip-wheel 35 to their zero positions.

*Resetting operation*

Preparatory to renewal of the dispensing operation, while the switch is open and the pump is idle, by turning the hand crank 23 counterclockwise, the pawls 68 become engaged in the groove 71 in the actuating shaft 22 with consequent entrainment of the integrating wheels 63, 64 and 65 and thereby said wheels are progressed to their common starting point. During the turning movement of the hand crank 23 the stud 26 on the flange-wheel 24 (Fig. 22) has engagement with the cam face 61 on the latch 47 whereupon said latch is tilted into position for engagement with the shoulder 29 on the tumbler-plate 27 where it is held by action of the toggle spring 53. (Fig. 23.)

In manipulating the crank, as in the resetting operation, the operator is apprised of the position of the trip-wheel when its recess 38 reaches the point for reception of the stud 39 on the bellcrank, because of the shock, which is noticeably felt by the operator, occasioned by the sudden entrance of the stud into the recess and subsequent return movement, by action of the bellcrank, of the trip-wheel to its zero position (Fig. 12). The perimeter of the wheel 24 overhangs the lock-finger 31 and thereby is prevented movement of the control lever 20 to switch closing position and consequent operation of the pump, except when its notch 25 is in lock-finger receiving position and the shoulder 29 on the tumbler-plate is engaged by the latch 47. In the resetting operation, by turning the actuating shaft, the trip-wheel 35 is revolved beyond its zero position sufficiently for reception of the stud 39 in the recess 38, at which point the notch 25 in the wheel 24 is out of lock-finger receiving position and consequently movement of the operating mechanism for closing the motor switch is forestalled until the trip-wheel, by the action of the bell-crank mechanism, is moved back to its zero position.

If in the event, during the resetting operation, the trip-wheel 35 is caused to overrun the point for the reception of the bell-crank stud in its recess 38, retractive rotation of the trip-wheel to the stud receiving point is prevented by engagement of the spring-pressed pawl 46 in the notch 45. Thus, revolving the actuating shaft back-wardly and consequent derangement of the integrating wheels is circumvented.

By locking the dispensing mechanism against operation while resetting of the integrating wheels to zero position and locking of the resetting mechanism against operation while dispensing liquid from the apparatus, patrons are assured of the quantities of liquid delivered to them by observation of the register, and the attendant operating the dispenser is prevented from delivering liquid to the patrons without proper indications by the register of the amounts of liquid delivered.

What I claim is:—

1. In liquid dispensing apparatus having a motor-driven pump connected with a source of liquid supply and provided with a dispensing line connected with the outlet of said pump and terminating with a manually-operated valve-controlled nozzle, a switch controlling the pump motor, a meter connected in said dispensing line, a register operatively connected with said meter provided with a manually-operated actuating shaft associated with mechanism for resetting the integrating wheels of said register, a stationary bracket for the support of said nozzle, a rock-shaft having operative connection with said switch provided with a lever for manually actuating said rock-shaft disposed to be locked in inoperative position by the said nozzle while said nozzle is supported on said bracket, mechanism associated with said actuating shaft and rock-shaft adapted to prevent concurrent operation of said shafts, a trip-wheel secured on said actuating shaft provided with a recess and a notch, a spring-actuated pawl engageable in said notch to limit backturning movement of said trip-wheel, and a spring actuated bell-crank associated with a stop to limit movement thereof in one direction and provided with a stud engageable in said recess to cause limited backturning movement of said actuating shaft to its zero position.

2. In a liquid dispenser having a liquid supply means including a motor-driven pump, a controlling switch therefor and a dispensing line connected with the outlet of said pump, a meter connected in said dispensing line, a register operatively connected with said meter provided with a manually-operated actuating shaft associated with mechanism for resetting the integrating wheels of said register, a rock-shaft having operative connection with said switch provided with a lever for manually actuating said rock-shaft, mechanism associated with said actuating shaft and rock-shaft adapted to prevent concurrent operation of said shafts, a trip-wheel secured on said actuating shaft provided with a recess and a notch, a spring-actuated pawl engageable in said notch to limit backturning of said wheel, and a spring actuated bell-crank associated with a stop to limit movement thereof in one direction and provided with a stud engageable in said recess to cause limited backturning movement of said actuating shaft to its zero position.

3. In a liquid dispenser having a liquid supply means including a motor-driven pump, a controlling switch therefor and a dispensing line connected with the outlet of said pump, a meter connected in said dispensing line, a register operatively connected with said meter provided with a manually-operated actuating shaft associated with mechanism for resetting the integrating wheels of said register, a trip-wheel secured on said actuating shaft provided with a recess and a notch, a spring-actuated pawl engageable in said notch to limit backturning movement of said trip-wheel, a spring-actuated bell-crank associated with a stop to limit movement thereof in one direction and provided with a stud engageable in said recess to cause limited backturning movement of said actuating shaft to its zero position, a manually operated lever connected with and controlling said switch, and an interlocking mechanism associated with said actuating shaft and lever so constituted as to permit operation of said shaft and lever singly and prevent concurrent operation thereof.

4. In a liquid dispenser having a liquid supply means, a switch controlling said means and a dispensing line, a meter connected in said line, a register actuated by the meter having a shaft and mechanism associated therewith for resetting the integrating wheels of said register, a trip-wheel secured on said actuating shaft provided with a recess and a notch, a spring-actuated pawl engageable in said notch to limit backturning movement of said trip-wheel, a spring-actuated bell-crank associated with a stop to limit movement thereof in one direction and provided with a stud engageable in said recess to cause limited backturning movement of said actuating shaft to its zero position, a manually-operated lever controlling said switch, and an interlocking mechanism associated with said shaft and lever adapted to prevent concurrent operation of said shaft and lever.

5. In a liquid dispenser having a liquid supply means including a meter and a register connected with and actuated by said meter, resetting mechanism for the integrating wheels of said register including a manually operated actuating shaft, an operating mechanism including a handle therefor connected with and controlling said supply means, a trip-wheel secured on said actuating shaft provided with a recess and a notch, a spring-actuated pawl engageable in said notch to limit backturning movement of said trip-wheel, a spring-actuated bell-crank associated with a stop to limit movement thereof in one direction and provided with a stud engageable in said recess to cause limited backturning movement of said actuating shaft to its zero position, and an interlocking mechanism associated with said shaft and operating mechanism adapted to prevent concurrent operation thereof.

6. A liquid dispenser having a liquid supply means provided with a controlling mechanism therefor, a dispensing line connected with the supply means provided with a meter and register actuated by said meter, a manually-operated shaft and mechanism associated with said shaft and register for resetting the integrating wheels of said register, and interlocking mechanism operatively associated with said shaft and controlling mechanism constituted so as to prevent concurrent operation thereof, said interlocking mechanism consisting of a notched wheel secured on said shaft and provided with a projecting stud, a tumbler-plate concentric with said notched wheel having limited turning movement relative thereto and having a shoulder adapted to partially close the notch in said notched wheel when in one of its positions, a spring tending to retain said plate in its notch-closing position, and a latch for engaging said tumbler-plate to hold said plate out of notch-closing position, said latch having in connection therewith a toggle spring to hold said latch in or out of engagement with said plate, said stud being adapted upon revolving of said notched wheel to move said latch into engaging position, said controlling mechanism having a lock-finger movable therewith adapted to enter the notch in said notched wheel when said notch is in lock-finger receiving position and unobstructed by said plate thereby to permit operation of said controlling mechanism, and having also a trip-finger which upon operation of said controlling mechanism engages and moves said latch out of its engaging position.

REUBEN E. BECHTOLD.